Sept. 29, 1959  V. D. POLHEMUS  2,906,543
INTERCONNECTED TORSION BAR SUSPENSION
Filed Dec. 15, 1954  4 Sheets-Sheet 1

INVENTOR
Von D. Polhemus
BY
Paul Fitzpatrick
ATTORNEY

Sept. 29, 1959  V. D. POLHEMUS  2,906,543
INTERCONNECTED TORSION BAR SUSPENSION
Filed Dec. 15, 1954  4 Sheets-Sheet 4

INVENTOR
Von D. Polhemus
BY
Paul Fitzpatrick
ATTORNEY

United States Patent Office 2,906,543
Patented Sept. 29, 1959

2,906,543

INTERCONNECTED TORSION BAR SUSPENSION

Von D. Polhemus, Franklin, Mich., assignor to General Motors Corporation, Detroit, Mich., a corporation of Delaware Application December 15, 1954, Serial No. 475,357

14 Claims. (Cl. 280—104)

This invention relates to vehicle suspension and particularly to suspension wherein the front and rear wheels on the same side of the vehicle are interconnected to a common torsion spring element.

It is well known in the prior art to connect front and rear wheels of a vehicle to a common suspension element. Arrangements of this type have the advantage of providing a very low spring rate with respect to forces acting upon individual wheels and thereby producing a very soft ride. Such arrangements have the additional advantage of distributing impact forces equally between the front and rear of the chassis and thus reducing localized frame stresses. Of the numerous systems suggested in the past, the most efficient and economical type utilizes longitudinally extending torsion bars, the opposite ends of which operatively engage the respective wheels in a manner imparting reverse torsional stresses on the bar. One such system is disclosed in the copending application Serial No. 475,454, Polhemus et al., filed December 15, 1954, entitled "Torsion Bar Suspension," assigned to General Motors Corporation.

While systems of the type referred to possess many desirable characteristics, in all known basic structures, the sprung weight is unstable about its transverse axis. That is, in the event that vertical forces are applied to the sprung mass either ahead or behind the center of gravity thereof, the sprung mass will rotate or tilt about a transverse axis passing substantially midway between the front and rear wheels rather than resiliently deform the suspension elements. Under such circumstances the torsion bars constituting the suspension elements merely rotate with respect to their frame mountings and do not resist tipping or pitching. For this reason it is necessary that auxiliary mechanisms be provided for initially leveling the sprung mass with respect to the ground and preventing subsequent deviation therefrom resulting from braking, acceleration, passenger load variations, or other changes in the vehicle center of gravity. An essential feature of any such auxiliary mechanism is that its effect on the theoretical properties of primary suspension be held to a minimum. In the past numerous pitch stabilizing devices have been devised in which additional spring elements have been interposed between each wheel and the vehicle frame. While this method obviously reduces or eliminates pitching or longitudinal tipping, it has the disadvantage of functioning to some extent as separate and individual wheel suspension also, and thus cancels out, to some extent, the desirable functional characteristics of the primary interconnecting suspension element.

An object of the present invention is to provide a longitudinally interconnected primary vehicle suspension having pitch stabilizing mechanism which is associated therewith in the manner providing minimum reduction in the theoretical load supporting characteristics of the primary suspension.

Another object is to provide in a suspension of the stated character a pitch control mechanism which is adapted to act directly on the primary torsion bar suspension to resist bodily rotation thereof relative to the vehicle frame.

A further object is to provide a device of the stated character which is disposed substantially equidistant between the opposite ends of the bar at or near the center of twist induced by static loading.

Still a further object is to provide a device of the type described having shock absorbing means associated therewith.

A still further object is to provide a device of the stated character which may be readily adjusted to initially level the vehicle or compensate for variation in passenger loading.

These and other objects and advantages of the invention will become more fully apparent as reference is had to the accompanying specification and drawings, wherein.

Figure 1:
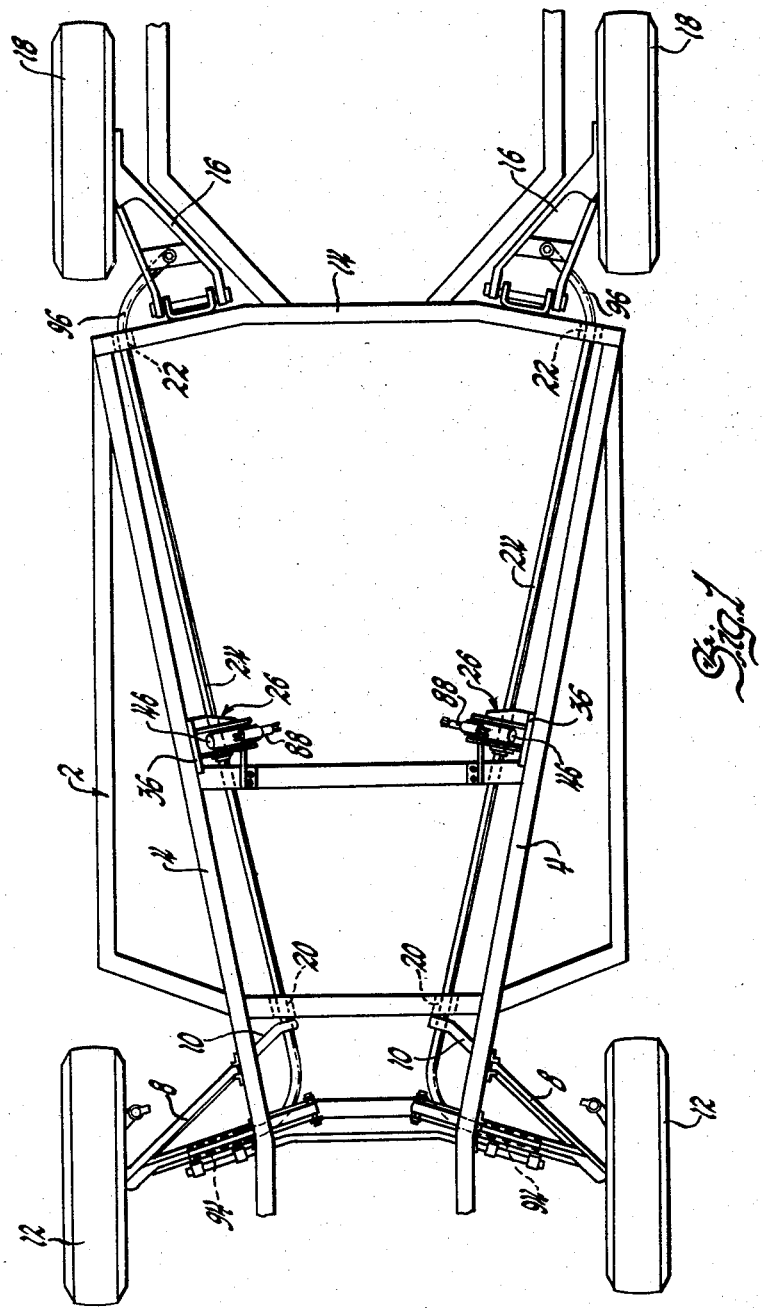
Fig. 1 is a plan view of a vehicle chassis illustrating the form and arrangement of the invention.
Figure 2:
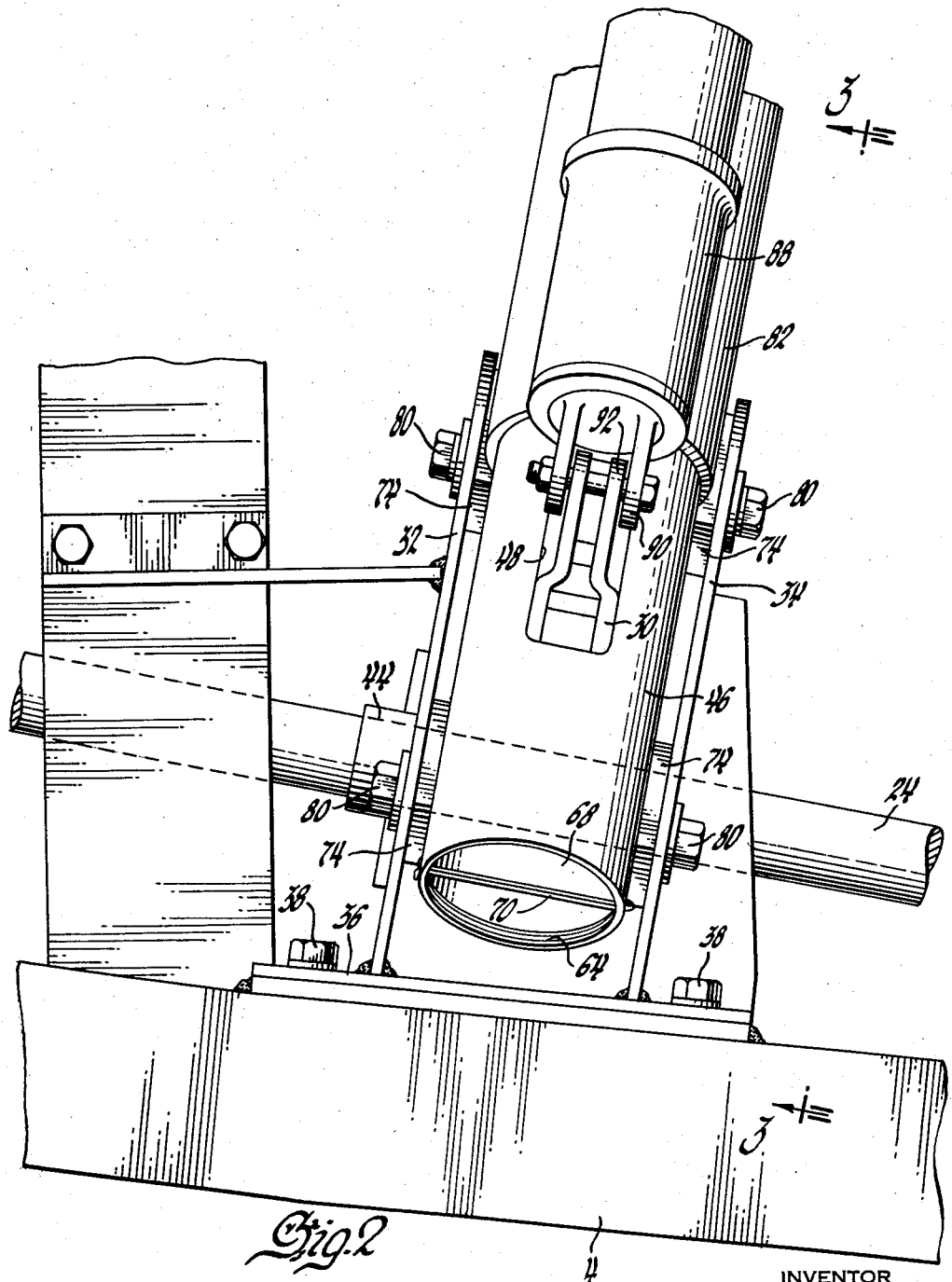
Fig. 2 is an enlarged fragmentary plan view of the pitch control mechanism illustrated in Fig. 1.

Referring now to the drawings, and particularly Fig. 1, there is illustrated a vehicle frame 2 having a pair of forwardly converging side frame members 4. At their forward ends members 4 have pivotally connected thereto vertically swingable upper and lower control arms 8 and 10, respectively. At their outer ends arms 8 and 10 are connected to dirigible front vehicle wheels 12 in a conventional manner. At its rear end frame 2 is provided with cross member 14 having pivotally connected thereto spaced apart longitudinally extending vertically swingable lever arms 16. Lever arms 16 in turn rotatably support rear vehicle wheels 18. Rotatably supported on frame 2 by longitudinally spaced bearings 20 and 22 are a pair of forwardly converging longitudinally extending torsion bar members 24. At their opposite ends bars 24 are bent or cranked in opposite directions and are operatively connected to lower control arms 10 and longitudinal levers 16. When arranged in this manner, vertical force applied to the front or rear wheel at the same side of the vehicle induces an equal but opposite force at the other wheel. Hence, when either a front or rear wheel on the same side of the vehicle passes over a change in elevation, producing a raising or lowering effort at one end of the vehicle, a simultaneous and similar raising or lowering effort is applied at the opposite end of the vehicle thus producing a "flat" ride. For a more complete description of the structure and mode of operation of such a suspension, reference may be had to the copending application Serial No. 475,454, Polhemus et al., entitled "Torsion Bar Suspension," assigned to General Motors Corporation.

In order to overcome inherent instability of the vehicle frame with respect to its lateral axis and maintain the sprung mass in a level attitude with respect to the road, there is provided pitch control mechanism 26 which coacts directly with torsion bars 24, rather than being disposed between the frame and the vehicle wheels as has been the practice heretofore. As seen best in Fig. 1, mechanisms 26 are disposed on side frame members 4 substantially midway between the forward and rearward ends of bars 24. In practice, the exact location will be determined by the calculated center of twist of the bar resulting from the reverse torsional loading of the opposite ends thereof.

Figure 3:
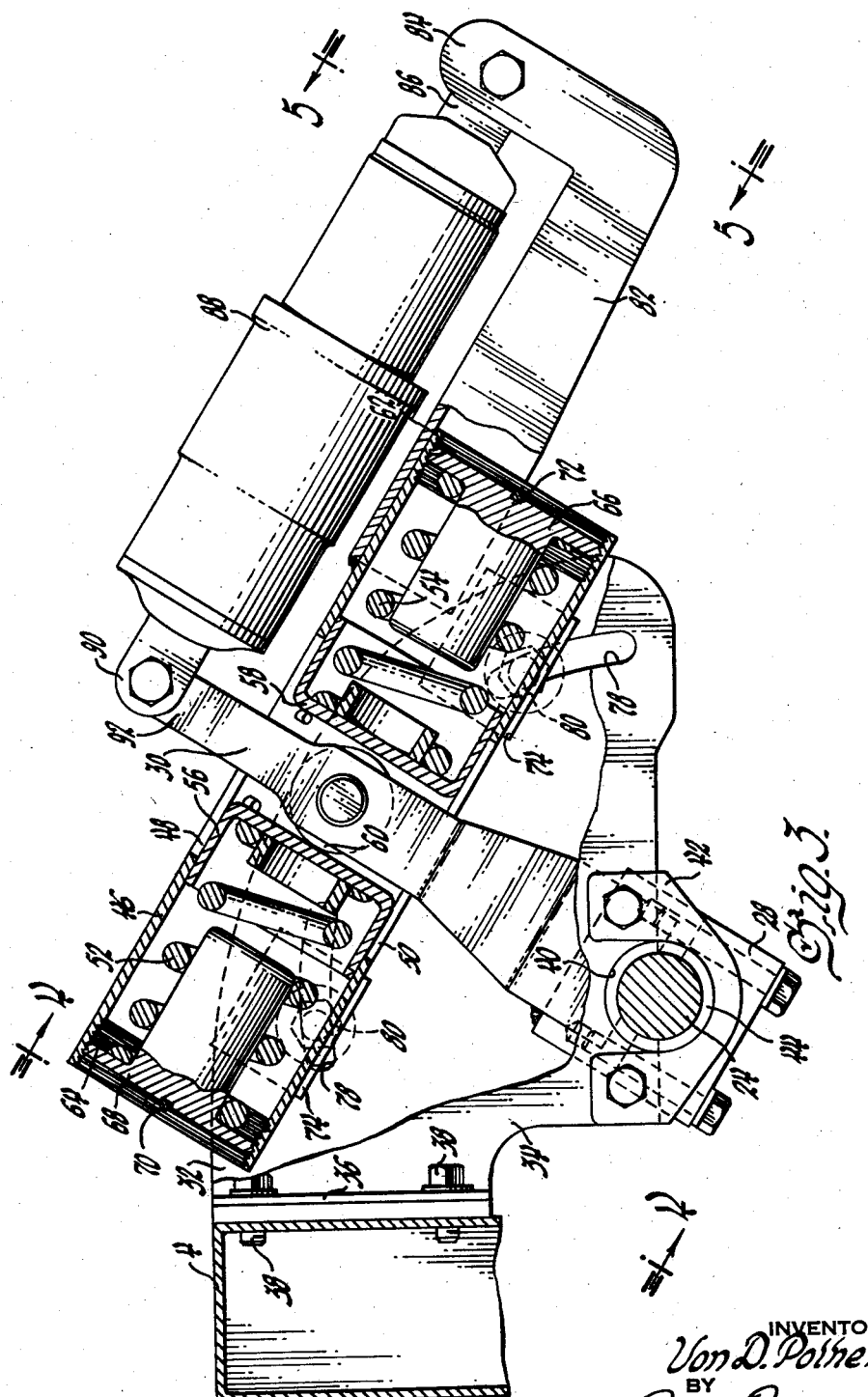
Fig. 3 is an enlarged rear elevational view, partly in section and with parts broken away, looking in the direction of arrows 3—3 of Fig. 2.

As seen best in Fig. 3, bar 24 has secured thereto, by means of a clamp structure 28, a laterally directed diagonal upwardly extending lever 30. Lever 30 is adapted for limited arcuate swinging movement upon rotation of bar 24. Directly overlying and partially surrounding lever 30 and extending inwardly from side frame member 4 are a pair of longitudinally spaced laterally extending guide plates 32 and 34 which are secured, as by welding, to a mounting bracket 36. Bracket 36, in turn, is secured by bolts 38 to the inner surface of side frame member 4. At their lower extremities, guide plates 32 and 34 are formed with semi-circular notches 40 which partially surround bar 24. A pair of U-shaped brackets 42 are bolted to guide plates 32 and 34 and surround the remaining portion of bar 24. A pair of sleeve bearings 44 surround bar 20 and are retained against axial displacement by U-shaped clamps 42 and notches 40.

Disposed between guide plates 32 and 34 is a diagonal downwardly extending tubular member or spring cage 46, the central portion of which is slotted at 48 and 50 to permit lever arm 30 to extend therethrough. Disposed interiorly of tubular member 46 at each end thereof are relatively heavy coil springs 52 and 54, the inner opposite ends of which engage slidable cup-like members 56 and 58. Members 56 and 58 in turn engage a roller 60 carried by lever arm 30. At its opposite terminal ends tubular member 46 is provided with internal threads 62 and 64 which are adapted to receive threaded caps 66 and 68. Caps 66 and 68 in turn engage the outer ends of springs 52 and 54 to maintain the resilient members in assembled relation. After threaded adjustment of caps 66 and 68 to provide balanced resilient pressure, cotter pins 70 and 72 are inserted to prevent change in adjustment.

Figure 4:
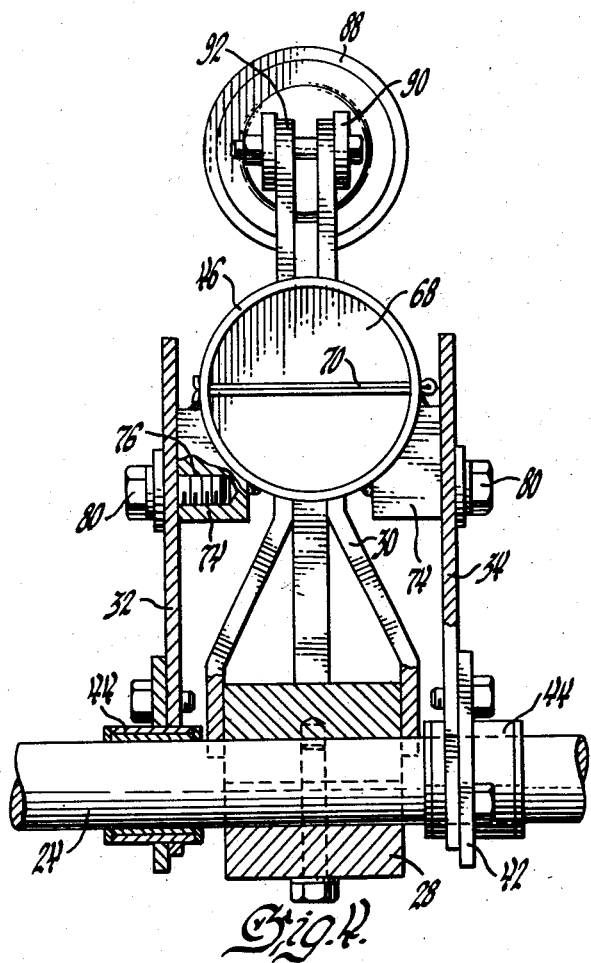
Fig. 4 is a view, partly in section, looking in the direction of arrows 4—4 of Fig. 3.
Figure 5:
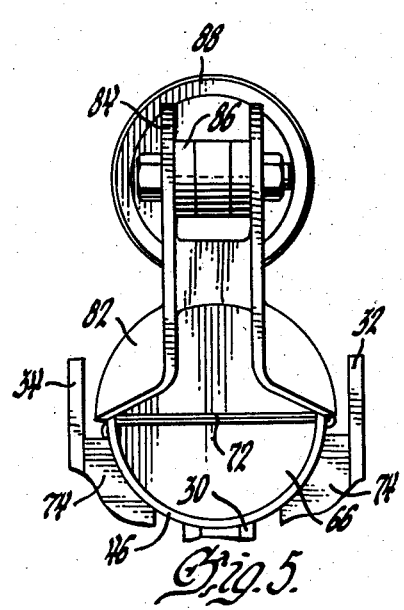
Fig. 5 is a fragmentary view looking in the direction of arrows 5—5 of Fig. 3.

As seen best in Fig. 4, the outer periphery of tubular member 46 has welded thereto a plurality of blocks 74 having transversely extending threaded bores 76 formed therein. Threaded bores 76 are aligned with arcuate slots 78 formed in the central wall portion of guide members 32 and 34. Bolts 80 extend through arcuate slots 78 and threadably engage blocks 74 to secure tubular member 46 in any desired angular position within the range of adjustment permitted by arcuate slots 78.

As seen best in Fig. 3, an L-shaped bracket 82 is secured, as by welding, to the lower side wall of tubular member 46. At its terminal extremity 84, bracket 82 is pivotally connected to one end 86 of a double-acting telescopic shock absorber 88. At its opposite end 90, shock absorber 88 is operatively connected to the terminal extremity 92 of lever 30.

In order that the invention may be more fully understood, a description of the mode of operation follows. Assume that the vehicle is unoccupied and parked on level terrain. If the center of gravity of the sprung mass is located longitudinally midway between the front and rear of the vehicle, the body will assume a level attitude with respect to the terrain. However, in the event that the center of gravity is either ahead or behind the longitudinal midpoint of the vehicle, tubular assembly 46 will require adjustment either upwardly or downwardly with respect to guide slots 78 until the proper vehicle level is attained. For example, it will be seen that by adjusting tubular cage 46 at the left side of the vehicle arcuately upwardly, lever 30 will be resiliently urged in a clockwise direction as viewed from the front, which will cause the forward cranked end 94 of bar 24 to swing downwardly and the rearward cranked end 96 to swing upwardly. Consequently, the forward end of the vehicle will be raised while the rearward end thereof will be lowered an equal amount. In practice, it will be desirable to make the initial adjustment to accommodate the normal or average vehicle loading. However, it will be apparent that tubular assembly 46 may be readily adapted for instantaneous adjustment by either manual or automatic means operable from the driving compartment, in which case the vehicle would preferably be leveled in accordance with the load conditions encountered.

After adjustment for static loading, instantaneous and intermittent forces tending to produce pitch are compensated for by springs 52 and 54 and shock absorber 88. It will, of course, be apparent that numerous transitory conditions such as acceleration, braking, and certain types of terrain will produce various degrees of pitching. Thus, shock absorber 88 acts to dampen severe but short-lived forces tending to produce pitching while springs 52 and 54 resiliently resist diving or squatting such as result from rapid acceleration and braking. However, under normal conditions springs 52 and 54 will constantly resiliently urge lever 30 toward an angular position wherein the sprung vehicle mass assumes a level attitude with respect to the road.

It should be particularly noted that in the present invention the auxiliary leveling and pitch control mechanism does not interfere appreciably with the normal suspension characteristics of the primary suspension, particularly under conditions of static loading, due to the location of the mechanism at the effective twist center of bars 24, whereas in the prior art the various means of leveling and accomplishing load compensation have, without exception, functioned directly to some extent as suspension elements and, therefore, partially counteracted the theoretical advantages of the primary suspension. While auxiliary mechanisms 26 reduce to some slight extent the theoretical capabilities of the primary suspension with respect to loads imposed on individual wheels, the extent of counteracting effect is substantially less than in any previous known type.

It is to be understood that, although the invention has been described with specific reference to a particular embodiment thereof, it is not to be so limited since changes and alterations therein may be made which are within the full intended scope of this invention as defined by the appended claims.

I claim:

1. In a vehicle having a frame supporting a longitudinally unbalanced load, a pair of longitudinally spaced vertically swingable supporting members secured to said frame, each of said members having a road wheel rotatably mounted thereon, a longitudinally extending torsion spring carried by said frame, said spring having its opposite ends connected respectively to said spaced supporting members in a manner whereby like vertical forces on said wheels imparts opposite torsional stress on said spring, and prestressed resilient means disposed adjacent the effective center of twist of said spring and reacting against said frame for maintaining the latter in a level position relative to said wheels.

2. In a vehicle having a frame, a pair of longitudinally spaced vertically swingable supporting members secured to said frame, each of said members having a road wheel rotatably mounted thereon, a longitudinally extending torsion spring carried by said frame, said spring having its opposite ends connected respectively to said spaced supporting members in a manner whereby like vertical forces on said wheels imparts opposite torsional stress on said spring, a lever secured to said spring adjacent the effective center of twist thereof, and resilient means engaging both sides of said lever to urge the same to an angular position wherein said frame is maintained in longitudinal parallel relation with said wheels.

3. In a vehicle having a frame, a pair of longitudinally spaced vertically swingable supporting members secured to said frame, each of said members having a road wheel rotatably mounted thereon, a longitudinally extending torsion spring carried by said frame, said spring having its opposite ends connected respectively to said spaced supporting members in a manner whereby like vertical forces on said wheels imparts opposite torsional stress on said spring, a lever secured to said spring adjacent the effective center of twist thereof, a pair of springs acting on said lever to urge the same to an angular position wherein said frame is maintained in longitudinal parallel relation with said wheels, a cage structure partially surrounding said lever and confining said springs, and means for adjusting said structure angularly on said frame to compensate for variations in frame loading.

4. In a vehicle having a frame, a pair of longitudinally spaced vertically swingable supporting members secured to said frame, each of said members having a road wheel rotatably mounted thereon, a longitudinally extending torsion spring carried by said frame, said spring having its opposite ends connected respectively to said spaced supporting members in a manner whereby like vertical forces on said wheels imparts opposite torsional stress on said spring, a lever secured to said spring adjacent the effective center of twist thereof, a cage structure secured to said frame adjacent said lever, means forming transversely aligned slots in said cage permitting said lever to extend therethrough, a pair of springs disposed interiorly of said cage, said springs being arranged to exert substantially equal but opposite pressure on said lever, and means for adjusting the angular position of said cage in an arc concentric with the axis of rotation of said torsion spring to accomplish initial leveling of said frame and resist longitudinal pitching thereof.

5. A pitch stabilizing device for a vehicle having longitudinally spaced wheels interconnected by a common torsion spring member, said device comprising a lever connected to said spring, a pair of resilient members disposed at opposite sides of said lever, and means for simultaneously shifting said resilient members bodily to cause the same to resiliently urge said lever to a position maintaining said vehicle in a level attitude.

6. A pitch stabilizing device for a vehicle having longitudinally spaced wheels interconnected by a common torsion spring member, said device comprising a lever connected to said spring, a pair of spring members disposed at opposite sides of said lever, a cage structure surrounding said springs, said structure having openings therein permitting said lever to extend therethrough, and means associated with each of said springs engaging said lever, means on said cage for adjusting compression of said springs, and guide means for said cage permitting angular adjustment thereof to maintain said vehicle in a level attitude.

7. A pitch stabilizing device for a vehicle having longitudinally spaced wheels interconnected by a common torsion spring member, said device comprising a lever connected to said spring, a pair of spring members disposed at opposite sides of said lever, a tubular cage structure surrounding said springs, said structure having elongated transverse openings therein permitting said lever to extend therethrough and swing arcuately through a limited range, means associated with each of said springs engaging said lever, means on said cage for adjusting compression of said springs, and guide means for said cage permitting angular adjustment thereof to maintain said vehicle in a level attitude.

8. A pitch stabilizing device for a vehicle having longitudinally spaced wheels interconnected by a common torsion spring member, said device comprising a lever connected to said spring, a pair of spring members disposed at opposite sides of said lever, a tubular cage structure surrounding said springs, said structure having elongated transverse openings therein permitting said lever to extend therethrough and swing arcuately through a limited range, means associated with each of said springs engaging an intermediate portion of said lever, means on said cage for adjusting compression of said springs, and guide means for said cage permitting angular adjustment thereof to maintain said vehicle in a level attitude.

9. A pitch stabilizing device for a vehicle having longitudinally spaced wheels interconnected by a common torsion spring member, said device comprising a lever connected to said spring, a pair of spring members disposed at opposite sides of said lever, a tubular cage structure surrounding said springs, said structure having elongated transverse openings therein permitting said lever to extend therethrough and swing arcuately through a limited range, means associated with each of said springs engaging an intermediate portion of said lever, threaded means at either end of said cage for adjusting said springs to predetermined compression against said lever, and guide means for said cage permitting angular adjustment thereof to maintain said vehicle in a level attitude.

10. A pitch stabilizing device for a vehicle having longitudinally spaced wheels interconnected by a common torsion spring member, said device comprising a lever connected to said spring, a pair of spring members disposed at opposite sides of said lever, a tubular cage structure surrounding said springs, said structure having elongated transverse openings therein permitting said lever to extend therethrough and swing arcuately through a limited range, means associated with each of said springs engaging an intermediate portion of said lever, threaded means at either end of said cage for adjusting said springs to predetermined compression against said lever, and transversely extending guide means for said cage permitting angular adjustment thereof to maintain said vehicle in a level attitude.

11. A pitch stabilizing device for a vehicle having longitudinally spaced wheels interconnected by a common torsion spring member, said device comprisng a lever connected to said spring, a pair of spring members disposed at opposite sides of said lever, a tubular cage structure surrounding said springs, said structure having elongated transverse openings therein permitting said lever to extend therethrough and swing arcuately through a limited range, means associated with each of said springs engaging an intermediate portion of said lever, threaded means at either end of said cage for adjusting said springs to predetermined compression against said lever, and spaced transversely extending guide means for said cage mounted on said frame permitting angular adjustment thereof to urge said lever to a position aligning said vehicle in a level attitude and thereafter resiliently resisting movement of said lever in either direction to control pitching motion of said frame.

12. A pitch stabilizing device for a vehicle having a frame and longitudinally spaced wheels interconnected by a common torsion spring member, said device comprising a lever connected to said spring, a pair of spring members disposed at opposite sides of said lever, a tubular cage structure surrounding said springs, said structure having elongated transverse openings therein permitting said lever to extend therethrough and swing arcuately through a limited range, means associated with each of said springs engaging an intermediate portion of said lever, threaded means at either end of said cage for adjusting said springs to predetermined compression against said lever, spaced transversely extending guide means for said cage mounted on said frame permitting angular adjustment thereof to urge said lever to a position aligning said vehicle in a level attitude and thereafter resiliently resisting movement of said lever in either direction to control pitching motion of said frame, and a hydraulic shock absorber connected between said lever and said cage.

13. A pitch stabilizing device for a vehicle having longitudinally spaced wheels interconnected by a common torsion spring member, said device comprising a lever rigidly connected to said spring and extending transversely thereof, a pair of spring members disposed at opposite sides of said lever, means for bodily shifting said resilient members to cause the same to resiliently urge said lever to an angular position to maintain said vehicle in a level attitude, and hydraulic shock absorber means acting on said lever to resist rapid angular movement of said lever.

14. A vehicle suspension system comprising a load carrying frame having a larger static load at one end thereof than at the other end thereof, front and rear longitudinally spaced wheels, front and rear lever means connecting said wheels to said frame, first and second torsion bar spring means operably connecting said front and rear lever means and being operably connected to said frame at opposite ends thereof, and torsionally resilient spring means operably disposed between each torsion bar spring means and the frame and being prestressed to impart a twisting force to each torsion bar spring means in a direction to effect lowering of the end of said frame having the lighter static loading and the raising of the end of said frame having the heavier static loading with respect to said wheels, said torsionally resilient spring means being mounted on said bars between and spaced from the ends thereof.

References Cited in the file of this patent

UNITED STATES PATENTS

| | | |
|---|---|---|
| 1,391,192 | Kelsey | Sept. 20, 1921 |
| 1,629,399 | Lord | May 17, 1927 |
| 1,681,050 | Robinson | Aug. 14, 1928 |
| 2,525,988 | Willson | Oct. 17, 1950 |
| 2,563,261 | Oster | Aug. 7, 1951 |
| 2,739,823 | Kolbe | Mar. 27, 1956 |